(12) United States Patent
Walker

(10) Patent No.: US 8,452,245 B2
(45) Date of Patent: *May 28, 2013

(54) IMPEDANCE MEASUREMENT IN AN ACTIVE RADIO FREQUENCY TRANSMITTER

(75) Inventor: Brian Walker, Halifax (CA)

(73) Assignee: Nautel Limited, Hackett's Cove, Nova Scotia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,661

(22) Filed: Mar. 6, 2012

(65) Prior Publication Data

US 2012/0170632 A1   Jul. 5, 2012

Related U.S. Application Data

(63) Continuation of application No. 12/421,519, filed on Apr. 9, 2009, now Pat. No. 8,213,885.

(60) Provisional application No. 61/044,213, filed on Apr. 11, 2008.

(51) Int. Cl.
*H03C 1/62* (2006.01)

(52) U.S. Cl.
USPC .................................... 455/115.1

(58) Field of Classification Search
None
See application file for complete search history.

(56) References Cited

U.S. PATENT DOCUMENTS

| | | | | |
|---|---|---|---|---|
| 4,799,066 A | * | 1/1989 | Deacon | 343/861 |
| 4,965,607 A | * | 10/1990 | Wilkins et al. | 343/861 |
| 4,967,159 A | * | 10/1990 | Manes | 324/650 |
| 5,206,600 A | * | 4/1993 | Moehlmann | 324/650 |
| 5,247,470 A | * | 9/1993 | McKown et al. | 708/314 |
| 5,386,194 A | * | 1/1995 | Moehlmann | 324/650 |
| 5,458,732 A | * | 10/1995 | Butler et al. | 216/61 |
| 5,565,737 A | * | 10/1996 | Keane | 315/111.21 |
| 5,931,892 A | * | 8/1999 | Thome et al. | 708/322 |
| 6,005,398 A | * | 12/1999 | Landt | 324/650 |
| 6,032,028 A | * | 2/2000 | Dickey et al. | 455/110 |
| 6,326,929 B1 | * | 12/2001 | Berranger | 343/703 |
| RE38,273 E | * | 10/2003 | Gerrish et al. | 315/111.21 |
| 6,707,255 B2 | * | 3/2004 | Coumou et al. | 315/111.41 |
| 7,151,382 B1 | | 12/2006 | Kean et al. | |
| 7,160,296 B2 | | 1/2007 | Pearson et al. | |
| 7,379,714 B2 | * | 5/2008 | Haque et al. | 455/107 |
| 7,489,145 B2 | * | 2/2009 | Matoba et al. | 324/707 |
| 7,542,518 B2 | | 6/2009 | Kim et al. | |
| 7,629,795 B2 | * | 12/2009 | Clunn | 324/525 |
| 8,140,033 B2 | * | 3/2012 | Chan Wai Po et al. | 455/115.1 |
| 8,155,303 B2 | * | 4/2012 | Kim et al. | 379/406.08 |
| 2004/0253921 A1 | * | 12/2004 | Turner | 455/2.01 |
| 2006/0036353 A1 | * | 2/2006 | Wintermantel | 700/300 |
| 2006/0232471 A1 | * | 10/2006 | Coumou | 342/450 |
| 2007/0118367 A1 | * | 5/2007 | Dickson et al. | 704/221 |
| 2009/0258614 A1 | | 10/2009 | Walker | |

* cited by examiner

*Primary Examiner* — Thomas J Hiltunen
(74) *Attorney, Agent, or Firm* — Vincent K. Gustafson; Jenkins, Wilson, Taylor & Hunt, P.A.

(57) ABSTRACT

A transmitter and method for determining impedance measurement in an active radio frequency transmitter of an antenna are provided. Voltage and current samples are obtained from a modulating signal delivered to an antenna. The voltage and current samples are converted from analog to digital format, and decimation occurs to reduce the number of samples. Complex demodulation is performed of each of the voltage and current samples to baseband levels and decimation of the voltage and current samples is performed to reduce the number of samples. An impedance estimate can then be estimated from the voltage and current samples.

12 Claims, 5 Drawing Sheets

IMPEDANCE MEASUREMENT IN AN ACTIVE RADIO FREQUENCY TRANSMITTER

CROSS REFERENCE TO RELATED APPLICATIONS

This application is a continuation of U.S. patent application Ser. No. 12/421,519 filed on Apr. 9, 2009, which further claims benefit of U.S. Provisional Patent Application No. 61/044,213 filed on Apr. 11, 2008. The disclosures of the foregoing patent applications are hereby incorporated by reference herein in their respective entireties, for all purposes.

TECHNICAL FIELD

The present disclosure relates to impedance measurement in a radio frequency transmitter. More specifically, it relates to a method for impedance measurement in an active, or running, radio frequency transmitter of an antenna coupled to the transmitter.

BACKGROUND

For radio broadcasters, knowing the impedance a transmitter is operating into can be essential for ensuring proper spectral performance and reception, particularly with digital standards such as National Radio System Committee NRSC-5A In-band/on-channel Digital Radio Broadcasting Standard. The impedance may be influenced by different factors such as the transmitter filter, tuning networks external to the transmitter, and the antenna. As a result, the impedance must fall within certain specifications, or problems may develop with respect to spectral compliance or reception which is especially true for digital operation.

Currently, the equipment required to determine the impedance that the transmitter is operating into has to be inserted at the appropriate place, so the transmitter must be disconnected to effect this measurement. This results in the transmitter being temporarily taken off the air while the measurement is being made. In addition, specialized equipment that may not be commonly available at the transmitter site is required to make the measurement. As a result of these factors, the current method is time consuming, costly and can require several iterations before an acceptable operating impedance is reached.

For broadcasters operating in a single frequency network, using a training signal to measure the impedance is not a preferred option, since emitting a tone would disrupt the other transmitters in the network. This method virtually eliminates reception, therefore, the broadcaster's only option for measuring the impedance involves disconnecting the transmitter to use low power test equipment. In addition a generated test signal is typically utilized to perform impedance measurements for matching network tuning. These estimates may not accurately characterize the impedance response based upon broadcast signals propagated by the antenna providing less than optimized tuning of the matching network.

The current methods of measuring the impedance seen by a transmitter require disconnecting the transmitter, which is inconvenient, time consuming, and costly, and does not provide a 'real-world' antenna impedance estimation. Accordingly, there is a need to develop a method to measure impedance seen by a transmitter in an antenna without having to remove the transmitter from the network.

SUMMARY OF THE INVENTION

The present disclosure provides a method that can be used to measure the impedance of an antenna while the transmitter is active.

In accordance with the present disclosure there is provided a method for determining impedance of an antenna coupled to an active radio frequency transmitter. Voltage and current samples are received from a sampling probe sampling a modulating broadcast signal being transmitted from the transmitter to the antenna. Analog to digital conversion is performed of the voltage and current samples. Complex demodulation is performed of each of the voltage and current samples to baseband levels. Decimation of the voltage and current samples is performed to reduce the number of samples and an impedance estimate is calculated from the decimated voltage and current samples.

In accordance with the present disclosure there is also provided a radio frequency transmitter comprising a modulation chain coupled to an antenna, the modulation chain modulating and amplifying a broadcast signal for transmission through the antenna. A voltage probe and a current probe sample the modulating broadcast signal between the modulation chain and the antenna. One or more analog to digital converters convert voltage and current samples. A down conversion module performs complex demodulation on the voltage and current samples and performing decimation of the voltage and current samples to reduce the number of samples. A signal processing module calculates an impedance estimate from the voltage and current samples.

Other aspects, features and embodiments of the invention will be more fully apparent from the ensuing disclosure and appended claims.

BRIEF DESCRIPTION OF THE DRAWINGS

Further features and advantages of the present disclosure will become apparent from the following detailed description, taken in combination with the appended drawings, as briefly described below.

It will be noted that throughout the appended drawings, like features are identified by like reference numerals.

DETAILED DESCRIPTION OF THE INVENTION, AND PREFERRED EMBODIMENTS THEREOF

Embodiments are described below, by way of example only, with reference to FIGS. 1-5.

The present disclosure is described with reference to digital radio broadcasting; however, any type of wireless or radio frequency broadcasting may utilize the system and method described herein.

The disclosed transmitter and method work with a modulating signal, rather than a fixed fundamental frequency or a training signal. The disclosure provides a device and method to generate an impedance estimate using real audio being transmitted through the system as the measurement is being made and still providing an accurate result. Since various type of signal modulation and encoding schemes can be utilized, such as amplitude modulated (AM) signals, frequency modulated (FM) signals, National Radio System Committee NRSC-5A In-band/on-channel Digital Radio Broadcasting Standard compliant signals, Digital Radio Mondiale (ETSI ES 201 980) compliant signals, or LORAN (Long Range Aid to Navigation) type system utilizing pulse signals, the frequency content available on any given update to the measurement is based on what content or audio is in the transmitted signal.

Figure 1:
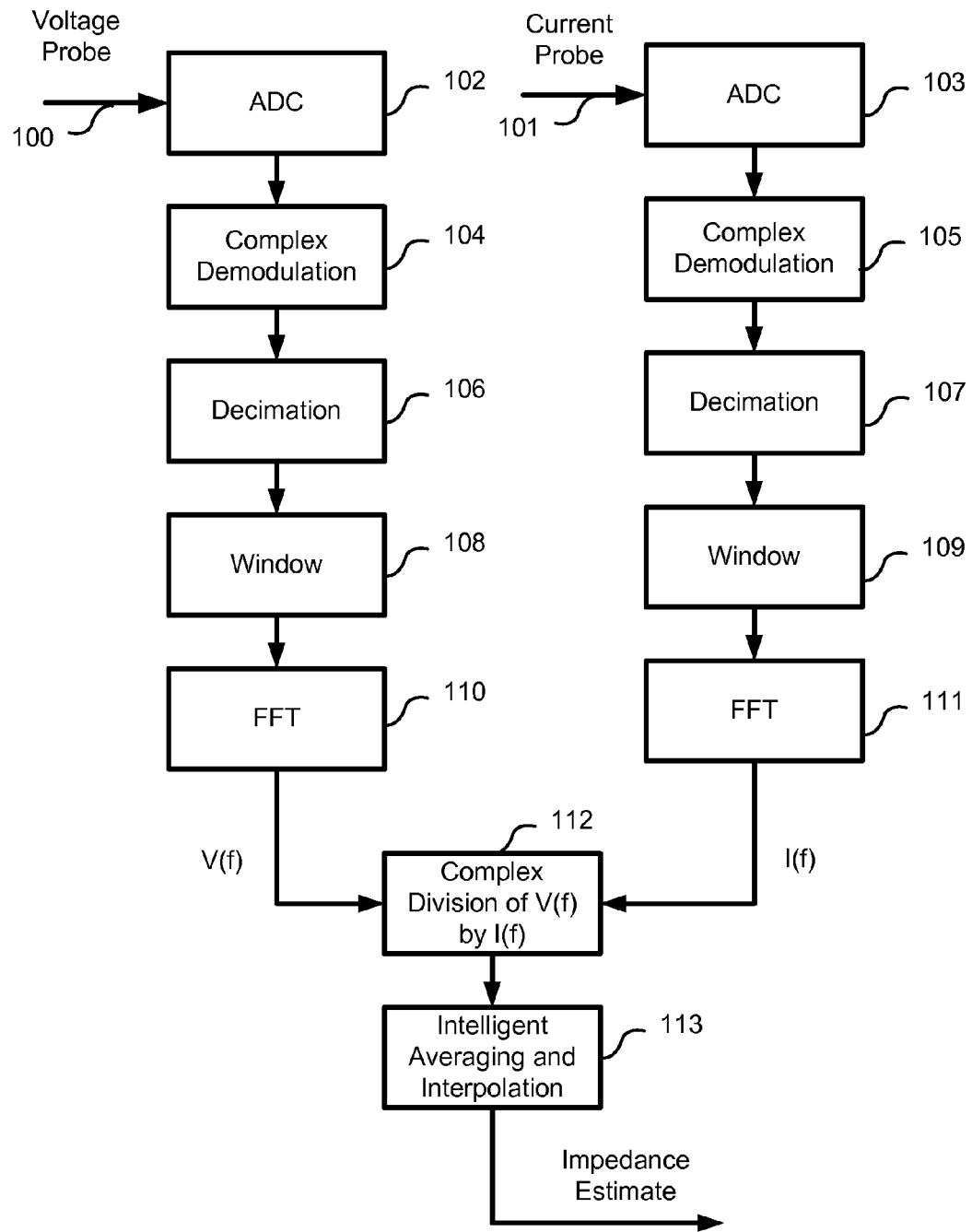
FIG. 1 shows a block representation of a process for generating an impedance estimate in an active radio frequency transmitter.

FIG. 1 shows a block representation of a process for generating an impedance estimate in an active transmitter of an antenna coupled to the transmitter. The voltage 100 and current 101 samples are measured using probes such as a transformer-coupled current probe and a capacitive attenuator voltage probe. The probes sample the modulating live broadcast signal across the range of frequency content. The sampling rate does not need any particular relationship to the carrier frequency of the modulated signal. Until the two voltage 100 and current 101 samples are used to calculate the impedance, both the voltage 100 and current 101 samples can be processed through independent parallel paths. The voltage 100 and current 101 are then sampled using analog-to-digital converters (ADC) 102 and 103 for each probe. Alternatively, the voltage 100 and current 101 could be calculated from alternative samples captured using appropriate probes. For example, directional couplers could be used to measure the forward and reflected voltage. In this case, voltage would be calculated by the sum of these samples and the current determined by the difference in the samples. This calculation can either be made on the analog samples, or at any point before the complex division 112.

In most cases, complex demodulation 104 and 105 is performed on each sample in order to shift the samples 100 and 101 from radio frequency back to baseband. This shift can be accomplished by multiplying a complex phasor at the carrier frequency. Alternatively, if the carrier frequency is low enough, the demodulation 104 and 105 can be bypassed. In this case, the resulting impedance measurement will be centered around baseband, rather than at the carrier frequency.

The signals are further processed by decimation at 106 and 107. By performing decimation at 106 and 107, the signals are passed through a low pass filter and then down-sampled to lower sampling rate. By decimating the signals, the computational requirements for the subsequent execution is reduced, since both the number of samples and the length of the discrete Fourier transforms (DFTs) to be implemented by the fast Fourier transforms are reduced. The amount of decimation required is dependent on the ADC bandwidth (number of bits) and sampling rate. A higher sampling rate will require more decimation of the samples before the FFT is applied.

The impedance measurements are calculated by using blocks of samples. The block length determines the computational requirements and the frequency of resolution that is obtained. For most antennas, the impedance will typically not vary dramatically over the pass band, so a block length that gives a reasonable number of sample points is appropriate. The sampling of these blocks will also affect the exact time domain points used to determine the impedance. Representative sampling methods include an overlapping window approach, such as that commonly used for power spectral density estimations, and random sampling. An overlapping window approach may be used in order to provide a more accurate estimation of the relative frequency content of the two time domain signals. Once the blocks of samples are obtained, it is preferred that a window function 108 and 109 is applied to minimize the effects of using finite length FFTs.

It is desirable to minimize the amount of spectral leakage to permit proper mapping of the impedance against frequency. This is a particularly important parameter to control for AM (amplitude modulation) broadcasting, since the large carrier would render any measurement made with a standard rectangular window essentially useless at any frequency aside from the carrier. Appropriate window functions 108 and 109 for this application include high-valued Kaiser windows, Blackmann-Harris window, Nuttall window, or similar low-resolution (high-dynamic-range) windows. However, based on the type of signal, any one of a number of windows could be applied. For example, if the signal has sufficient frequency content at all desired measurement frequencies, a window with less dynamic range may be used. Alternatively, the windowing may be bypassed entirely if the signal permits a rectangular window to be used, although some degradation to the resulting impedance measurement may occur. Once the samples are processed through the above window functions 108 and 109, they are passed through a discrete Fourier transform (DFT) such as a finite Fourier transform (FFT) 110 and 111 to extract the phase and amplitude of each frequency component on both the voltage and current samples for each block.

The fast Fourier transform (FFT) can be applied to extract the phase and amplitude of each frequency component; however, based on the type of signal, other methods can be employed to extract this information. The resulting frequency domains for the voltage and the current can be used to determine an approximate value for the impedance in which the transmitter is feeding into. For example, the impedance at each frequency can be obtained by dividing the frequency domain value for the voltage by the frequency domain value of the current (represented by block 112). In other cases, such as when forward and reflected voltage is used to calculate the voltage and current, additional equations or data manipulation may be required to obtain the impedance.

The accuracy of impedance measurement is highly dependent on the level of frequency content present in the sampled block. Accordingly, the estimates must be averaged to obtain a reasonably accurate measurement. To achieve such an average, a first-order decaying exponential filter with an adequate delay can be applied. Similar-type filters could be applied to the estimates in order to achieve a reasonably accurate measurement.

Since the signal being used for the estimate is not a training signal or known signal, there may be frequencies that have either intermittent or no signal content. If the impedance calculation is performed and there is not enough signal content, then the estimate will be inaccurate at those frequencies. In these cases, intelligent averaging and interpolation 113 is applied to mitigate this effect. There are several different ways this can be accomplished. For example, if the signal intermittently has content at all frequencies, the impedance estimate can be managed by making the weighting of the average proportional to the signal power present in that block at each frequency. Using this method, the points with the most power at a particular frequency will have the most influence on the impedance estimate at that frequency. However, situations will still arise where there is no power at all, at certain frequencies. If there is no signal content at the frequency in question, and no reasonable estimate can be obtained for the impedance, a value can potentially be interpolated from other known points.

Figure 2:
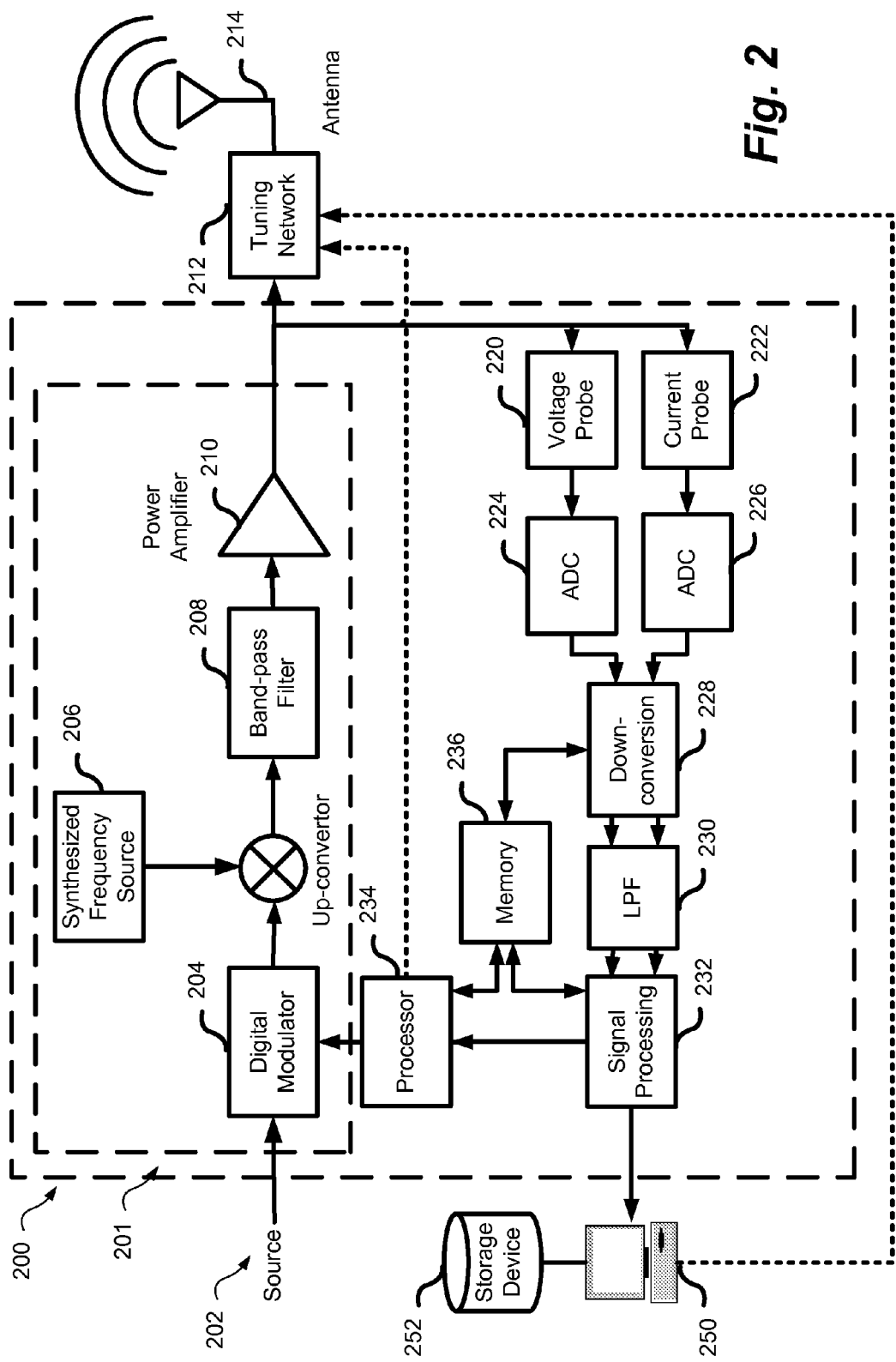
FIG. 2 shows a representation of system for generating an impedance estimate in an active radio frequency transmitter.

FIG. 2 shows a transmitter 200 providing impedance measurement capability. A signal source 202 provides a broadcast or audio input to the transmitter 200 and the modulation chain 201. A digital modulator 204 modulates the incoming signal to the desired modulation. The modulating signal is then up-converted by a synthesized frequency source 206 to the desired carrier frequency. The resulting signal is then filtered by a band-pass filter 208, such as a dual band-pass filter, to remove unwanted frequency components. The signal is then amplified by one or more power amplifiers 210. A transmission line connects the transmitter 200 to a tuning or load matching network 212 to provide impedance matching with an antenna 214. The tuning network 212 is typically adjusted by using a test signal and lower power test equipment to calculate an impedance estimate. In the present disclosure samples of the amplified signal prior in the transmission line to the tuning network 212 are sampled using voltage and current probes 220 and 222. The probes may alternatively be directional couplers. The directional couplers measure the forward and reverse voltage waves in the transmission line, whereas the voltage probe measures the voltage just at that point in the line, and the current probe measures the current at that point. If the load is perfect (for example: resistive 50 ohm load) then the voltage and current measured at different lengths along the transmission line would be the same. If not, a high and low points in both voltage and current result, determined by the voltage standing wave ratio. For most purposes, such as finding out power delivered to the load, or measuring the spectrum going to the antenna, the directional sample is better, since all that is needed is the forward voltage to make that measurement. In higher frequency (FM) systems directional couplers are more common than pure voltage or current samples, and are typically coupled off using the geometry of the probe, rather than a transformer or capacitor. The relationship is that the forward voltage is the sum of the current and voltage samples at any point on the transmission line, and the reverse voltage is the difference.

The voltage 220 and current 222 probe or coupler provide an analog output to analog to digital converters (ADCs) 224 and 226 respectively. The digital output is then demodulated using complex demodulation using the down-conversion module 228. Complex demodulation may be performed using a processor such as a digital signal processor (DSP), field programmable gate array (FPGA) or application specific integrated circuit (ASIC). The down-conversion module 228 can also provide decimation of the samples prior to passing through a low pass filter 230 to remove the −2fc. The decimation process down-samples the demodulated digital signals to a lower sampling rate. After filtering has been performed the remaining frequency data is processed by a signal processing module 232. Again, the signal processing module 232 may be implemented by one or more processor, DSPs, FPGAs, or ASICs or a combination thereof. The signal processing module 232 can then implement processing of the samples such as by using a FFT to extract phase and amplitude of each frequency component for both the voltage and current samples for each block. Alternatively, the signal processing module 232 may perform adaptive filtering using a finite impulse response (FIR), filter such as Least Mean Squares and zero padding the FIR result to generate an impedance estimate. The resulting FIR structure produces a filter with the same amplitude and phase response as the antenna load.

The resulting impedance data can then be further processed by processor 234, for either providing pre-distortion data to digital modulator 204, providing control of the tuning network or tuning values for use by the tuning network 212 to improve transmission efficiency and performance. Alternatively, the data may be provided to an external data processing system such as a computer 250 for further trending or storage on storage device 252. Again, this data may be utilized to control the load matching network 212. A computer or processor readable memory 236 may be used by the processors of down-conversion module 228, signal processing module 232 or processor module 234 to enable access to software code or instructions, determine data value, configuration parameters or operating characteristics. The memory 234 may be embodied in random access memory, read only memory, non-volatile memory such as flash memory.

Figure 3:
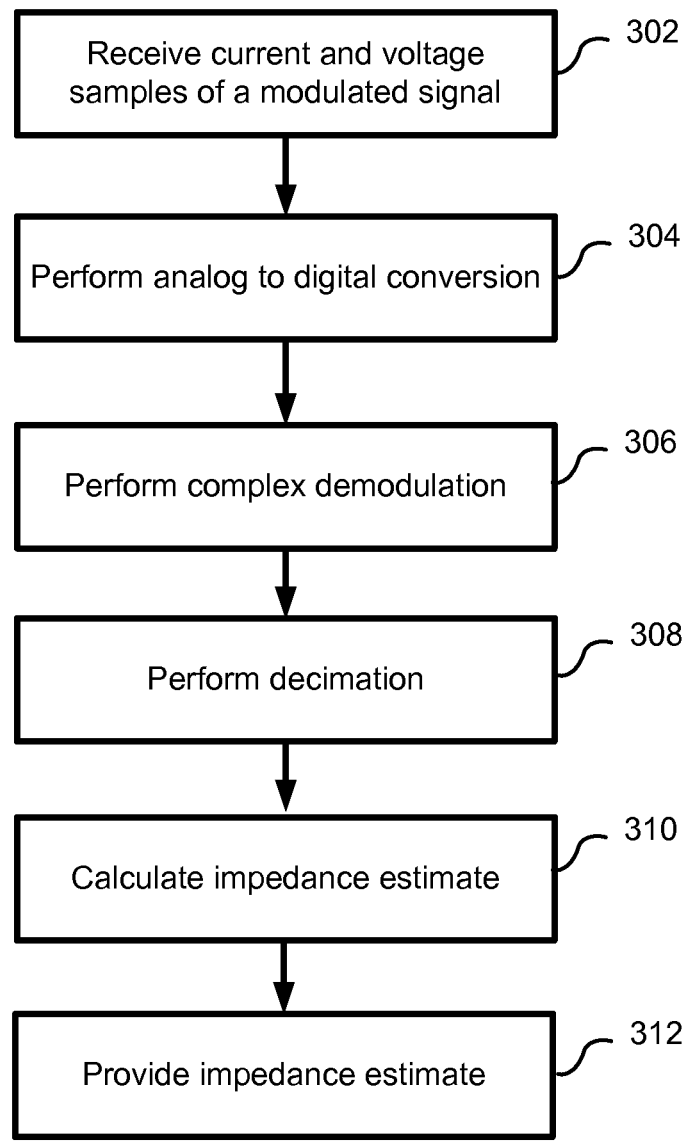
FIG. 3 shows a method of generating an impedance estimate in an active radio frequency transmitter.

FIG. 3 shows a method of generating an impedance estimate in an active transmitter. The method commences with receiving voltage and current samples of a modulating signal 302 from a transmission line between a transmitter 200 and an antenna 214 using voltage and current probes 220 and 222. The sampling is provided at a fixed sampling rate independent of the carrier frequency of the RF transmission. Analog to digital down conversion is then performed at 304 of voltage and current samples by ADCs 224 and 226. The samples may be converted in parallel or sequentially depending on the implementation of the ADC converters. Complex demodulation is then performed on the digital samples at 306 by down-conversion module 228. The demodulated samples are decimated at 308 to reduce the number of samples to be processed. The estimate may also be filtered using a low pass filter 230. The impedance estimate can by generated by performing impedance calculations using the voltage and frequency samples by signal processing unit 232. The impedance estimate may be determined using frequency domains for the voltage and current samples as described in FIG. 4 or by determining a frequency response between current and voltage samples using a time domain adaptive filtering method as described in FIG. 5. The impedance estimate can then be provided to internal processor 234 or external computing device 250 at 312 for further processing or storage. The resulting estimate may then be provided to load matching network or digital modulator 204 to improve performance of the transmitter 200.

Figure 4:
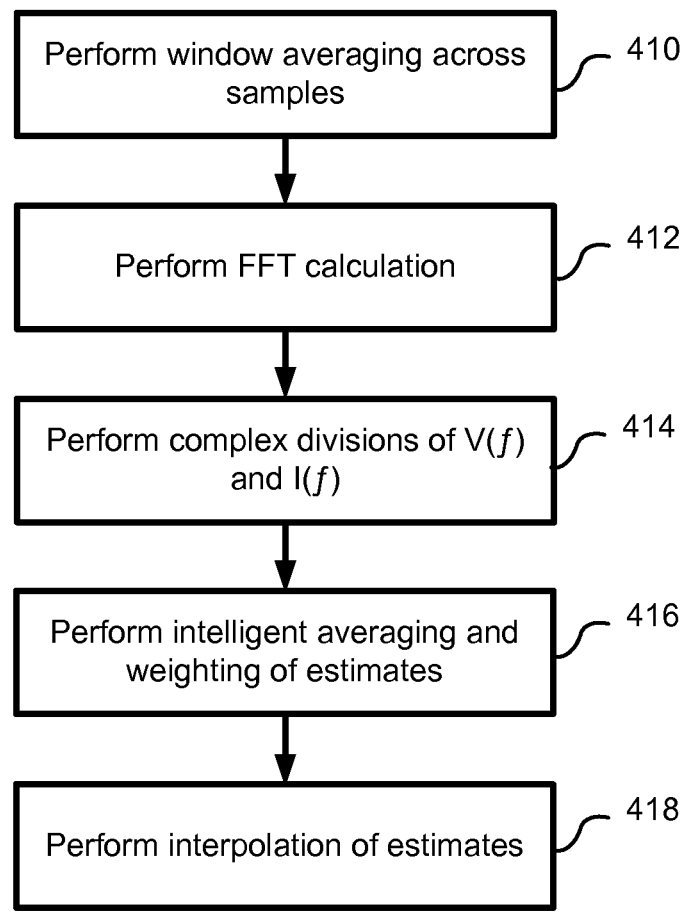
FIG. 4 shows a method of calculating an impedance estimate in an active radio frequency transmitter using a fast Fourier transform.

FIG. 4 shows a method of calculating an impedance estimate in an active transmitter using a fast Fourier transform (FFT) as implemented at 310 of FIG. 3. The signal processing unit 232 at 410 can, after decimation and filtering is performed at 308, apply a windowing function for averaging across the samples based upon the type of transmitted signal. Windowing is applied to shape the time portion of sample data, to minimize edge effects that result in spectral leakage in the FFT spectrum. By using window functions correctly, the spectral resolution of the frequency-domain result will increase. Windowing is required when using a broadcast signal due to the large carrier frequency component. The modulating signal content is typically anywhere from 15 to 50 dB lower, so getting an accurate measurement without it would be unfeasible.

Appropriate windowing functions for this application include high-valued Kaiser windows, Blackmann-Harris window, Nuttall window, or similar low-resolution (high-dynamic-range) windowing techniques. However, based on the type of signal, any one of a number of windowing techniques could be applied. Similarly windowing may be bypassed if it is not required for the signal being analyzed. A FFT calculation is then performed on the data to extract the phase and amplitude of each frequency component on both the voltage and current samples at 412. Complex division of V(f) and V) can then be performed to generate the impedance estimates for the modulating signal at 414. With certain types of broadcast programs, especially voice content, this can vary by large amounts (40 to 50 dB) from one batch of samples to the next, this is where the "intelligent averaging" can be applied at 416. By weighting the average according to the amount of energy in each bin, a much more accurate result is obtained. Interpolation can then be applied for missing frequencies at 418 if no data is available and to mitigate effects of using a live signal for estimation.

Figure 5:
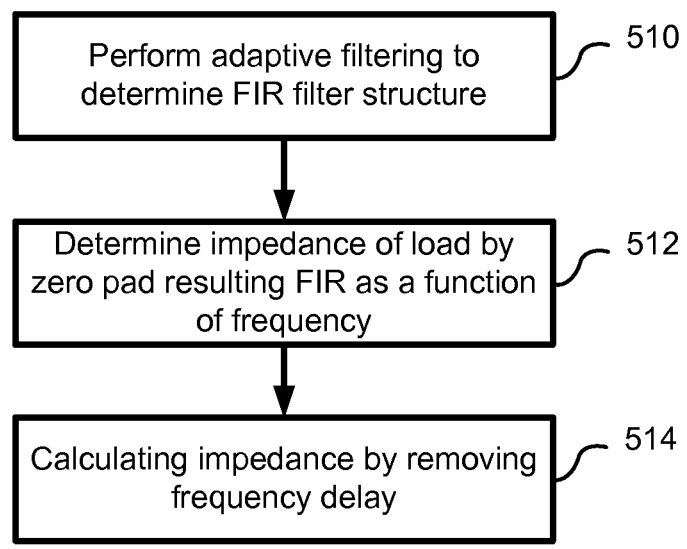
FIG. 5 shows a method of calculating an impedance estimate in an active radio frequency transmitter using time domain adaptive filtering.

FIG. 5 shows a method of calculating an impedance estimate in an active transmitter using time domain adaptive filtering as implemented at 310 of FIG. 3. As an alternative to the approach using FFTs of the current and voltage signals, the frequency response between current and voltage can be determined using a time domain adaptive filtering method. After decimation at 308, the current samples and a delayed version of the voltage samples are passed into an adaptive finite impulse response (FIR) filtering process, such as Least Mean Squares (LMS) at 510. Other adaptive FIR algorithms could also be used. The current samples are taken to be the input to this process, with the delayed voltage samples representing the desired signal. As the filtering process adapts the resulting FIR structure, it will produce a filter with the same amplitude and phase response as the load, with some additional delay. The adaptive filtering process is inherently averaging, so the impedance measured by this method would not require any further averaging. Once the filter has been determined, the impedance estimate of the load can be determined by zero-padding the filter and taking a DFT (or FFT) at 512. This provides a complex response of the load versus frequency. The additional delay added to the voltage vector in the adaptive filtering process must be removed at 514 to get an accurate phase measurement. This can be accomplished by converting the delay to the appropriate phase at each frequency and canceling it. The resulting estimate can than be provided at 312.

It will be understood that a combination of hardware and software components, with some components being implemented by a given function or operation of a hardware or software system, and many of the data paths illustrated being implemented by data communication within a computer application or operating system. In addition, numerous modifications thereto will appear to those skilled in the art. Accordingly, the above description and accompanying drawings should be taken as illustrative and not in a limiting sense. It will further be understood that it is intended to cover any variations, uses, or adaptations following, in general, the principles of the disclosure and including such departures from the present disclosure as come within known or customary practice within the art to which the disclosure pertains and as may be applied to the essential features herein before set forth, and as follows in the scope of the appended claims. A computer readable memory may be utilized to store instructions of the described method for execution by a processor, DSP or ASIC.

What is claimed is:

1. A method for determining impedance of an antenna coupled to an active radio frequency transmitter, and involving use of the transmitter for such impedance determination, the method comprising:
    receiving voltage and current samples across a range of frequency content from a sampling probe sampling a modulating broadcast signal being transmitted from the transmitter to the antenna;
    performing analog to digital conversion of the voltage and current samples;
    performing complex demodulation of each of the voltage and current samples to baseband levels;
    performing decimation of the voltage and current samples to reduce the number of samples;
    calculating an impedance estimate from the decimated voltage and current samples; and
    removing delay by converting the delay to the appropriate phase at each frequency and cancelling same.

2. The method of claim 1, wherein calculating the impedance estimate further comprises:
    performing windowing and averaging across a plurality of voltage and current samples;
    performing a fast Fourier transform of the plurality of voltage and current samples; and
    performing complex divisions of V(f) and I(f) to calculate the impedance estimates.

3. The method of claim 2, wherein said windowing is selected from the group consisting of: high-valued Kaiser window, Blackmann-Harris window, Nuttall window, and high-dynamic-range windowing functions.

4. The method of claim 1, further comprising using the calculated impedance estimate to adjust a matching network coupled to the antenna.

5. The method of claim 1, wherein the broadcast signal comprises at least one of an amplitude modulated (AM) signal, a frequency modulated (FM) signal, a National Radio System Committee NRSC-5A In-band/on-channel Digital Radio Broadcasting Standard compliant signal, a Digital Radio Mondiale (ETSI ES 201 980) compliant signal, and a LORAN (Long Range Aid to Navigation) compliant signal.

6. A radio frequency transmitter comprising:
    a modulation chain coupled to an antenna, the modulation chain modulating and amplifying a broadcast signal for transmission through the antenna;
    a voltage probe and a current probe for sampling the modulating broadcast signal across a range of frequency content between the modulation chain and the antenna;
    one or more analog to digital converters for converting voltage and current samples;
    a down conversion module adapted to (i) perform complex demodulation on the voltage and current samples, and (ii) perform decimation of the voltage and current samples to reduce the number of samples; and
    a signal processing module for calculating an impedance estimate from the voltage and current samples;
    wherein the radio frequency transmitter is adapted to remove delay by converting the delay to the appropriate phase at each frequency and cancelling same.

7. The radio frequency transmitter of claim 6, wherein the signal processing module is adapted to:
    (a) perform windowing and averaging across a plurality of voltage and current samples;
    (b) perform a fast Fourier transform of the plurality of voltage and current samples; and
    (c) perform complex divisions of V(f) and I(f).

8. The radio frequency transmitter of claim 7, wherein said windowing is selected from the group consisting of: high-valued Kaiser window, Blackmann-Harris window, Nuttall window, and high-dynamic-range windowing functions.

9. The radio frequency transmitter of claim 6, wherein the modulation chain further comprises:
    a digital modulator to modulate a received broadcast signal;
    a synthesized frequency source adapted to up-convert the signal modulated by the digital modulator;
    a band-pass filter adapted to filter the up-converted broadcast signal; and
    an amplifier coupled to the antenna and adapted to transmit the broadcast signal.

10. The radio frequency transmitter of claim 9, wherein a tuning network is coupled between the transmitter and the antenna, and wherein the impedance estimate is used for adjusting the tuning network.

11. The radio frequency transmitter of claim 6, wherein the voltage and current probes comprise a transformer-coupled current probe and a capacitive attenuator voltage probe.

12. The radio frequency transmitter of claim 6, wherein the broadcast signal comprises at least one of an amplitude modulated (AM) signal, a frequency modulated (FM) signal, a National Radio System Committee NRSC-5A In-band/on-channel Digital Radio Broadcasting Standard compliant signal, a Digital Radio Mondiale (ETSI ES 201 980) compliant signal, and a LORAN (Long Range Aid to Navigation) compliant signal.

* * * * *